Figures 1, 2, 3, 4, 5:
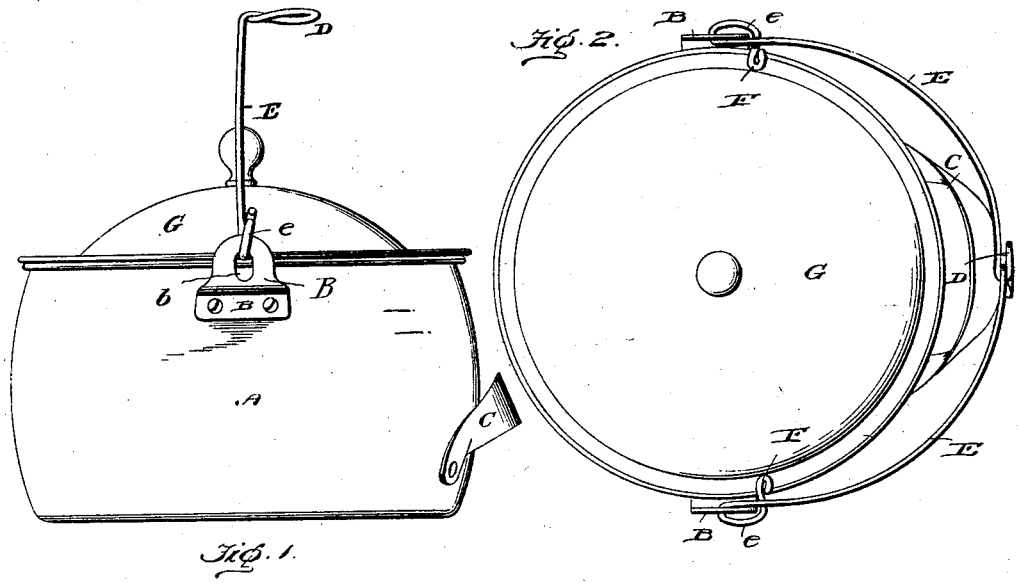

No. 630,393. Patented Aug. 8, 1899.
J. B. MOWRY.
BAIL.
(Application filed Mar. 27, 1899.)

(No Model.)

Witnesses

Inventor
Joseph B. Mowry
By Edson Bro's,
Attorneys

UNITED STATES PATENT OFFICE.

JOSEPH B. MOWRY, OF MANSFIELD, OHIO.

BAIL.

SPECIFICATION forming part of Letters Patent No. 630,393, dated August 8, 1899.

Application filed March 27, 1899. Serial No. 710,675. (No model.)

*To all whom it may concern:*

Be it known that I, JOSEPH B. MOWRY, a citizen of the United States, residing at Mansfield, in the county of Richland and State of Ohio, have invented certain new and useful Improvements in Bails; and I do hereby declare the following to be a full, clear, and exact description of the invention, such as will enable others skilled in the art to which it appertains to make and use the same.

My present invention relates to improvements in bails or handles for cooking vessels of that class which are in use covered by removable and separately-formed covers.

The object of the invention is to provide a handle for such a vessel which is adapted to serve as a means for moving the vessel and also as a means for holding the removable cover on the vessel when the latter is inclined in such manner as to allow a desired amount of liquid contained therein to escape.

In the accompanying drawings, Figure 1 is a side elevation of a kettle-like vessel having my improvements applied thereto, the bail being shown in the position occupied when used alone to lift the vessel. Fig. 2 is a plan view, the bail being in the position occupied when used to assist in tilting the vessel. Fig. 3 is a perspective view showing my improved bail in position to hold the cover on a vessel while allowing the liquid contents thereof to escape. Figs. 4 and 5 are detail views of slightly-modified forms of bail.

Referring to the drawings, in which like letters of reference designate corresponding parts in the several figures, A designates a cooking vessel which may be of any form and size. The vessel A is provided at diametrically opposite points with ears B, which extend above the upper edge of the vessel and to which the bail or handle, to be hereinafter described, is connected. The vessel A is also provided with a handhold C, which in the embodiment of the invention herein illustrated is rigidly attached to the vessel, near the bottom thereof, at points between the ears B.

My improved bail or handle is formed from a single piece of wire or rod of suitable diameter and length. This rod is initially bent upon itself to form at a point midway of its length a ring or loop D, and two arms or members E, that extend in opposite directions from said ring or loop. The said arms or members E of the bail are connected with the ears B in such manner that the vessel can be supported by means of said handle, and the latter can be turned about its point of attachment therewith. Preferably the free end of the arm E extends through an eye or aperture *b* in the ear B to which it is to be attached, the body of said member of the bail lying between the said ears. After passing through the eye *b* the end of said bail member E is bent upon itself, as at *e*, passing across one of the edges of the ear B and across the body of the bail. The said end extends some distance within the side lines of the bail member to form a lug or stop F. If desired, the size and strength of this stop lug or projection on the bail member may be increased by bending the metal of the rod upon itself, as shown in the drawings.

By reference to the drawings it will be seen that the centrally-arranged ring or loop D does not lie in the planes of the members E of the bail or handle, but its connection therewith is such that it extends at right angles to the length of the bail. The loop formed at the end of each bail member E is of such size as to permit the bail to be turned about the said ears, and the distance between the outer edge of said loop and the lug or pin F connected therewith is such that when the bail is turned into an upright vertical position, as shown in Fig. 1, a cover G can be easily slipped between said stops F and the upper edge of the vessel A.

The manner of using my improvements is illustrated in the drawings and may be briefly described as follows: When it is desired to pour any liquid from the vessel without removing the cover or lid G, the bail or handle is turned about its connection with the ears B until it occupies the position shown in Fig. 2. When in this position, it will be seen that the ring or loop D lies above and in line with the stationary handhold C, and the inwardly-extending lugs F contact with the cover G and hold the same in such engagement with the body of the vessel A that it is prevented from slipping therefrom when the vessel is turned into such a position as is shown in Fig. 3. The vessel is easily turned and supported in this inclined position by inserting the thumb in the ring or loop D and grasping the handhold C with the other fingers of the hand. When in such position, the lugs F, as aforesaid, prevent the cover G from slipping from the vessel; but the lower forward edge of the cover does not have such a close engagement with the adjacent edge of the vessel as to prevent the escape of liquid therefrom. This allows the liquid to escape from the vessel without danger of spilling any solid matter that may be contained therein.

In Figs. 4 and 5 of the drawings I have illustrated two forms of bails which differ slightly from that hereinbefore described, but which are adapted to perform the same function. Referring particularly to Fig. 4, it will be seen that the cover-retaining stops are formed on the bail before connecting it with the ears B on the vessel—that is, I bend each of the bail members E upon itself to form a ring F', which lies above the cover G and is adapted to act thereon in the same manner as the lugs or pins F in the embodiment of my invention illustrated in Figs. 1 to 3, inclusive. I have also in Fig. 4 illustrated a connection between the ears B on the vessel and the bail to positively hold the latter in a vertical position when desired—that is, I provide the ears B each with an outwardly-extending lip $b'$ at the upper end and in said lip form an aperture. The free end of the bail member E is passed through the eye or aperture in the vertical wall of the ear and then bent so as to provide the depending end E', which is adapted to extend through the aperture in the lip $b'$. By lifting the bail bodily, which the size of the eyes in the vertical members of the ears B allows, the portions E' thereof can be disengaged from the ears, and then the bail can be turned to cause the stops F' to engage with the cover G. The form of bail shown in Fig. 5 has its members E extending outside of the ears B and then bent to extend through eyes in said ears. After passing across the inner faces of the ears B the ends of the bail are bent inwardly to form the stops $F^2$.

What I claim is—

1. The combination with a hollow vessel, of two bail-ears attached to the vessel at opposite points and each having at its free end an outwardly and horizontally extending lip or flange, and a bail or handle having its opposite recurved ends extending through eyes in the vertical walls of said ears on the vessel and adapted to detachably engage with the lips at the upper ends of said ears when the bail is in a position directly above the vessel, substantially as set forth.

2. The combination with a hollow vessel, of two bail-ears attached to the vessel at opposite points and each having at its free end a laterally and horizontally projecting flange, and a bail or handle having its opposite recurved ends extending through eyes in the vertical walls of the bail-ears and adapted, when the handle is in a vertical position, to extend through openings in the lateral flanges on said ears, substantially as set forth.

3. The combination with a hollow vessel, of two bail-ears attached thereto at opposite points and each having, at its free end, an outwardly and horizontally extending lip or flange, a bail pivotally connected with said ears, a handhold secured to the vessel between the points of attachment therewith of the bail, inward extensions of the bail, in the plane thereof, for engaging with, and maintaining, a detachable cover on the vessel when the bail is lowered toward said handhold on the vessel, the ends of said bail adapted to engage with the lips of the ears when the bail is in a position directly above the vessel, substantially as set forth.

4. The combination, with a hollow vessel, of a bail or handle pivotally connected with opposite sides of the vessel, a handhold secured to the vessel between the points of attachment therewith of the bail, and inward extensions of the bail, in the plane thereof, for bearing upon, and maintaining, a detachable cover on the vessel when the bail is lowered toward said handhold, whereby the bail and handhold may be grasped, and the vessel tilted, by one hand, substantially as described.

In testimony whereof I affix my signature in presence of two witnesses.

JOSEPH B. MOWRY.

Witnesses:
JAS. J. MAGUIRE,
B. S. LAWRENCE.